Patented Mar. 21, 1950

2,501,090

UNITED STATES PATENT OFFICE 2,501,090

PROCESS FOR THE TREATMENT OF VISCOSE YARN

Alfred Politzer, Cleveland, Ohio, assignor to Oscar Kohorn & Co. Ltd., New York, N. Y., a corporation of New York No Drawing. Application May 29, 1947, Serial No. 751,459

10 Claims. (Cl. 18—54)

The present invention relates to an improved process for the production of artificial cellulose products, and it relates more particularly to an improved process for the aftertreatment of regenerated cellulose products such as filament yarn, staple fiber, tow, transparent sheeting and other similar products.

In the manufacture of regenerated cellulose products such as rayon, filament yarn, staple fiber or transparent sheeting by the viscose method, the freshly spun rayon, transparent sheeting or other cellulose product after the coagulation or regeneration, is subjected to a liquid aftertreatment in order to remove any impurities which have formed on or have been picked up by the regenerated cellulose in the production of the viscose or during the coagulation and regeneration of the viscose in the spin bath to the formed product.

The steps generally employed in the liquid aftertreatment of regenerated cellulose products produced by the viscous process consist of first washing the formed cellulose product in order to remove the spin bath chemicals accumulated thereon, which chemicals consist principally of sulphuric acid, metallic sulphates and organic compounds. Thereafter the regenerated cellulose is subjected to a desulphurizing step wherein the sulphur which is a product of the chemical reaction accompanying the regeneration of the cellulose is removed. Following this desulphurizing step the regenerated cellulose product is treated with a dilute solution of hydrochloric or sulphuric acid in order to decompose and consequently remove the metallic sulphides. These metallic sulphides are the products of metals present in the viscose, spin bath, desulphurizing solution (principally sodium sulphide) and water into the corresponding sulphides which are decomposed by the acid in this step. Occasionally, the regenerated cellulose product is then bleached or semi-bleached in order to remove the organic compounds which impart to such product a color which may be undesirable.

It is an object of the present invention to provide an improved process for the liquid aftertreatment of regenerated cellulose products.

It is another object of the present invention to provide an improved process for the liquid aftertreatment of regenerated cellulose products wherein the acid-treating step is replaced by a more efficient and economical step.

It is another object of the present invention to provide an improved process for the liquid aftertreatment of regenerated cellulose products, which process results in a product of better quality than the processes heretofore employed.

The present invention broadly contemplates subjecting the regenerated cellulose products to a solution of a complex forming phosphate. This step replaces the acid-treatment step set forth above, reducing the total time consumed in the liquid aftertreatment of the regenerated cellulose product, reducing the cost thereof and improving the resulting regenerated cellulose product.

More particularly, the freshly formed regenerated cellulose product is subjected to the usual washing and desulphurizing steps as above set forth, the desulphurizing step being followed by a water wash. The water wash is carried only to a point where the effluent is still alkaline, preferably in a pH range between approximately 9.5 and 10.5. Thereafter a concentrated solution of the phosphate salt is added to the liquid wash whereby such wash is approximately of a concentration of .05% to .1%, although this range may be varied in accordance with the cellulose product being treated and the phosphate employed.

After the regenerated cellulose product has been treated for a predetermined period of time with the phosphate solution, the regenerated cellulose product may then be washed and further treated in a manner well known. Examples of phosphates which may be employed are: sodium hexametaphosphate, sodium heptaphosphate, tetrasodiumpyrophosphate, sodium tripolyphosphate, sodium tetraphosphate, or the potassium or other soluble salts thereof. It is believed that the effectiveness of the above phosphates is due to the sequestering action thereof toward metals such as iron, calcium, magnesium, etc., resulting in the formation of soluble complex compounds which are easily removed. Further, the phosphates in the alkaline solution may act as a detergent.

The following is an example employing the improved process in accordance with the present invention as applied to a cake of filament rayon: a freshly spun cake of viscose filament rayon yarn, weighing about .95 lb. and of 250 denier, which cake has been spun into a centrifugal bucket rotating at 6500 R. P. M., is washed with soft water for a period of 60 minutes until neutral. The cake is then subjected to a desulphurizing solution of .6% sodium sulphide plus .1% sodium hydroxide, at a temperature of 70° C., for a period of 45 minutes. Following this the cake is washed with soft water at a temperature of 45° C., for a period of 20 minutes, the wash water being recirculated, while being continuously bled-off and replenished. At this point the wash water is still alkaline.

Thereafter a concentrated solution of sodium heptaphosphate or sodium hexametaphosphate is added to the wash water so that a concentration of between .05% and .1% of the above salt is achieved. This solution is then circulated through the cakes for a period of 20 minutes. Following this the cakes are washed with soft water until they are neutral, this wash requiring approximately an additional 30 minutes. The cakes are then soaped with a soap solution of .5% neutral soap, at a temperature of 50° C.

By employing the processes above set forth a considerable saving of time is achieved, inasmuch as the acid treatment and the following water wash are eliminated, whereas the after-desulphurizing wash is only slightly prolonged. Since the over-all treating time is reduced, the capacity of the aftertreating equipment of a given size is correspondingly increased, thereby reducing the unit cost of production. Moreover, it has been found that the final regenerated cellulose products where the present process has been employed, are of substantially reduced metal content, of improved color and of generally improved quality.

While there has been described several embodiments of the present invention, it should be understood that numerous changes and omissions may be made without departing from the spirit thereof.

I claim:

1. In the production of regenerated cellulose products the step comprising subjecting the freshly regenerated cellulose product to a solution of a salt of the group consisting of polyphosphates, metaphosphates and pyrophosphates.

2. In the production of regenerated cellulose products the step comprising subjecting the freshly regenerated cellulose product to a solution of an alkali metal salt of heptaphosphate.

3. In the production of regenerated cellulose products the step comprising subjecting the freshly regenerated cellulose product to a solution of an alkali metal salt of hexametaphosphate.

4. In the production of regenerated cellulose products the step comprising subjecting the freshly regenerated cellulose product to a solution of sodium hexametaphosphate.

5. In the production of regenerated cellulose products the step comprising subjecting the freshly regenerated cellulose product to a solution of sodium heptaphosphate.

6. In the production of regenerated cellulose products the step comprising subjecting the freshly regenerated cellulose product to a solution of sodium hexametaphosphate having a concentration between .05% and .1%.

7. In the production of regenerated cellulose products the step comprising subjecting the freshly regenerated cellulose product to a solution of sodium heptaphosphate having a concentration between .05% and .1%.

8. In the production of regenerated cellulose products the steps comprising washing the freshly regenerated cellulose product whereby said cellulose product is contaminated with insoluble metal salts, desulphurizing the washed cellulose product and thereafter treating the cellulose product with an alkaline solution of a salt of the group consisting of polyphosphates, metaphosphates and pyrophosphates.

9. In the production of regenerated cellulose products the steps comprising washing the freshly regenerated cellulose product, treating the said washed regenerated cellulose product with a solution of sodium sulfide, whereby said cellulose product is contaminated with insoluble metallic sulfides, and thereafter treating the cellulose product with an alkaline solution of sodium heptaphosphate.

10. In the production of regenerated cellulose products the steps comprising washing the freshly regenerated cellulose product, treating the said washed regenerated cellulose product with a solution of sodium sulfide whereby said cellulose product is contaminated with insoluble metallic sulfides, and thereafter treating the cellulose product with an alkaline solution of sodium hexametaphosphate.

ALFRED POLITZER.

REFERENCES CITED

The following references are of record in the file of this patent:

UNITED STATES PATENTS

| Number | Name | Date |
|---|---|---|
| 1,580,843 | Mendel | Apr. 13, 1926 |